United States Patent [19]

MacTavish

[11] Patent Number: 4,718,547
[45] Date of Patent: Jan. 12, 1988

[54] COMPACT DISC SECURITY PACKAGE

[76] Inventor: William D. MacTavish, 309 Sequoya Dr., Hopkinsville, Ky. 42240

[21] Appl. No.: 78,387

[22] Filed: Jul. 27, 1987

[51] Int. Cl.⁴ .............................................. B65D 85/57
[52] U.S. Cl. ..................................... 206/309; 206/1.5; 206/387; 206/807
[58] Field of Search ................. 206/1.5, 307, 309–313, 206/387, 444, 807; 360/133; 369/77.2

[56] References Cited

U.S. PATENT DOCUMENTS

| | | | |
|---|---|---|---|
| 3,675,763 | 7/1972 | Sandel | 206/387 |
| 3,871,516 | 3/1975 | Holkestad et al. | 206/387 |
| 3,994,395 | 11/1976 | Bennett-Robertson | 206/387 |
| 4,245,741 | 1/1981 | Holkestad | 206/387 |
| 4,361,233 | 11/1982 | Holkestad | 206/387 |
| 4,381,836 | 5/1983 | Rivkin et al. | 206/807 |
| 4,512,468 | 4/1985 | Stravitz | 206/387 |
| 4,589,549 | 5/1986 | Hehn | 206/387 |
| 4,620,630 | 11/1986 | Moss | 206/313 |
| 4,623,062 | 11/1986 | Chase et al. | 206/807 |

Primary Examiner—Jimmy G. Foster
Attorney, Agent, or Firm—Harrington A. Lackey

[57] ABSTRACT

A hollow thermoplastic unitary, parallelepiped receptacle having open front and back faces, closed side walls, one closed end wall, and an open end including a hinged closure member for receiving a conventional elongated rectangular compact disc container having a compartment in one end portion of the container receiving a rectangular storage box containing a compact disc. The receptacle includes a pair of transverse rib members in its back face for transverse alignment with the interior transverse edge of the compact disc storage box when the container is inserted either right-side-up or upside down into its operative position within the receptacle.

7 Claims, 13 Drawing Figures

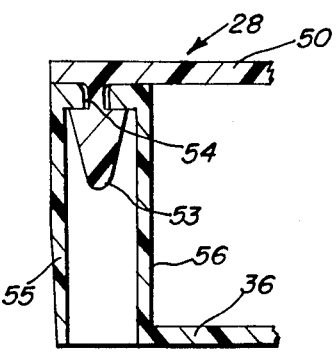
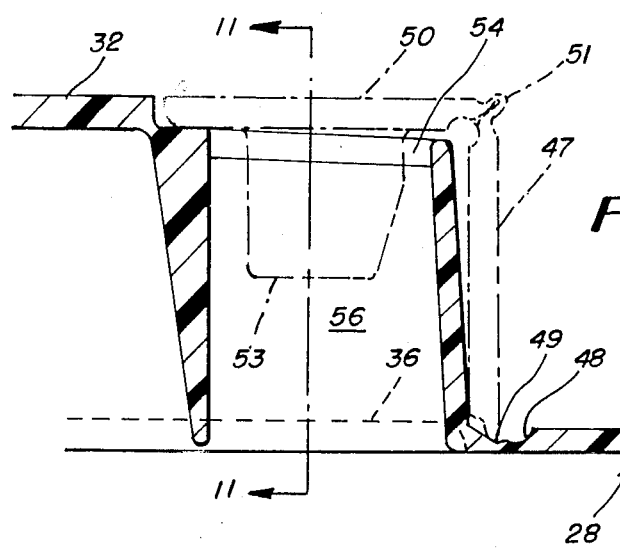
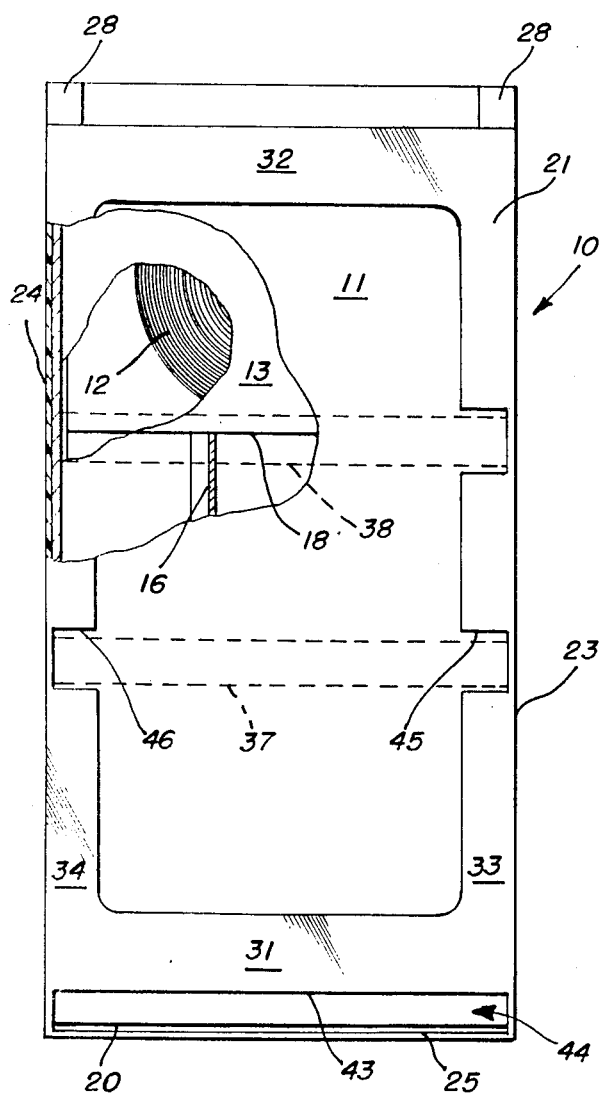
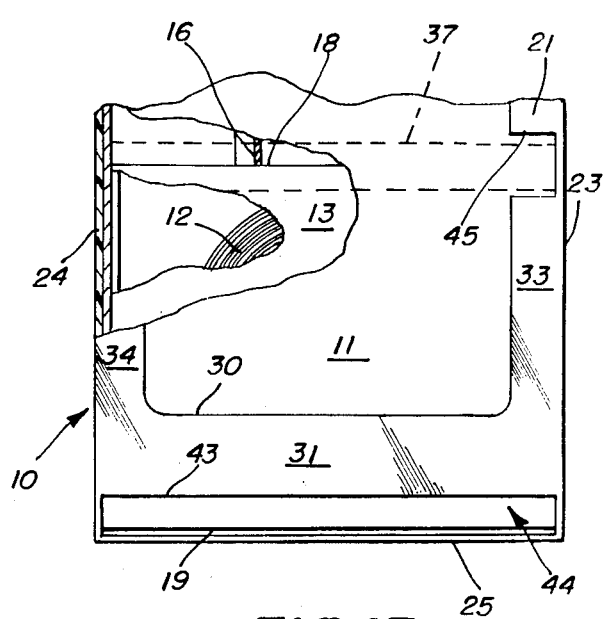

COMPACT DISC SECURITY PACKAGE

BACKGROUND OF THE INVENTION

This invention relates to a security receptacle, and more particularly to a security receptacle particularly adapted for receiving a compact disc container.

Even though the compact disc is emerging as an improved medium of recording information, and particularly music for the home entertainment industry, nevertheless, security problems have arisen in the packaging and marketing of compact discs similar to those existing for the packaging and marketing of tapes and cassettes. Because the compact disc is approximately 4¾"–5" in diameter, it is small enough in size, and valuable enough at retail prices in the range of $14.00–$20.00 per disc, to encounter a high degree of pilferage and concealment by shoplifters. The compact disc is normally contained within a square or rectangular storage box referred to as a "jewel box", which is only slightly larger than the compact disc. To discourage shoplifting, the jewel box is attached to an elongated cardboard panel or container at least twice as long as the jewel box, to, in effect, enlarge the total package so that it may not be easily placed in a shoplifter's pocket, handbag, or otherwise concealed.

Another type of package to discourage pilferage of a compact disc is disclosed in U.S. Pat. No. 4,620,630 of Ira L. Moss, issued Nov. 4, 1986, for "COMPACT DISC IN CONVERTIBLE ENCLOSURE". The Moss package includes the compact disc within a paper sleeve received within a folded stiffener member, which in turn is slipped into an outer envelope, for display. The envelope is at least twice the diameter of the disc. After the package is purchased, the stiffener is removed so that the flexible envelope may be folded to a smaller size for storage.

The following U.S. patents disclose various types of cassette or disc type storage receptacles:

| | | |
|---|---|---|
| 3,828,922 | Holkestad | Aug. 13, 1974 |
| 3,980,178 | Schidlowski | Sept. 14, 1976 |
| 4,369,879 | Egly et al | Jan. 25, 1983 |
| 4,381,836 | Rivkin et al | May 3, 1983 |
| 4,511,034 | Pan | Apr. 16, 1985 |
| 4,519,500 | Perchak | May 28, 1985 |

All of the above patents except the Perchak U.S. Pat. No. 4,519,500 disclose various types of latching devices for securing the containers.

The U.S. Pat. Nos. 3,828,922 Holkestad, and the Rivkin et al U.S. Pat. No. 4,381,836 disclose security or anti-theft containers cassettes or tapes.

The Holkestad U.S. Pat. No. 3,828,922 discloses a unitary molded plastic anti-theft receptacle for a cassette incorporating staggered transverse ribs 34, 36, 38 and 40 in the front and back faces of the receptacle. The staggered ribs are incorporated to facilitate the injection molding of the receptacle, as described in column 2, lines 58–61 of the Holkestad patent.

The following U.S. patents disclose various types of other storage containers having latched closures:

| | | |
|---|---|---|
| 3,642,102 | Furniss et al | Feb. 15, 1972 |
| 4,043,448 | Tanaka | Aug. 23, 1977 |

SUMMARY OF THE INVENTION

A security package made in accordance with this invention is particularly constructed to receive and discourage pilferage of an elongated, rectangular compact disc container in which the compact disc contained within a "substantially square jewel box" is fitted in a compartment in one end portion of the rectangular container, which is more than twice as long as the jewel box. The rectangular container is conventionally made of cardboard, and even though great 4 enough to avoid concealment within the pocket or handbag of a potential shoplifter, nevertheless, is subject to destruction or mutilation for removal of the jewel box and the compact disc.

The receptacle made in accordance with this invention is a hollow, parallelepiped receptacle made of a homogeneous thermoplastic material and is preferably molded in a unitary body including its hinged closure and locking tabs.

The receptacle made in accordance with this invention is designed in such a manner that it rigidly encloses the entire cardboard or chip board elongated container for the compact disc and will secure the compact disc against pilferage equally well, whether the container is received right-side-or P, or upside down within the rigid receptacle.

Furthermore, the latch mechanism for the hinged closure is such that it cannot be easily removed without destruction of the receptacle, to prevent unauthorized entry into the receptacle once the hinged lid is closed and locked.

A further object of this invention is to provide a security package for a compact disc and its elongated cardboard container in which most of the area of the receptacle walls are open for clearly displaying the graphic material upon the compact disc container.

More specifically, the security receptacle made in accordance with this invention includes a hollow, parallelepiped receptacle of molded plastic material having closed side walls and one closed end wall, a front face wall having a large display opening surrounded by side and end flanges and an open back traversed by a pair of transverse end ledges and a pair of intermediate transverse rib members. The rib members are accurately located so that either rib member will register in transverse alignment with the inner edge of the jewel box, when the jewel box is retained in the same end portion of the receptacle occupied by that particular rib member. These rib members, either of which is transversely aligned with the inner edge of the jewel box, prevent an unauthorized person from entering manually, or with a tool, the display openings, separating the jewel box from the cardboard container and removing the jewel box including its compact disc.

BRIEF DESCRIPTION OF THE DRAWINGS

FIG. 10 is a fragmentary section taken along the line 10—10 of FIG. 9, showing the hinged lid in a solid-line open position, and in a phantom closed position;

FIG. 11 is a fragmentary sectional view taken along the line 11—11 of FIG. 10;

FIG. 12 is a face view similar to FIG. 2 with the container received in a right-side-up operative position within the receptacle, and with portions of the container and jewel box broken away; and FIG. 13 is a fragmentary view similar to FIG. 11 with the container received in an upside down operative position within the receptacle, and with portions of the container and jewel box broken away.

DESCRIPTION OF THE PREFERRED EMBODIMENTS

Figures 1, 2, 3, 4:
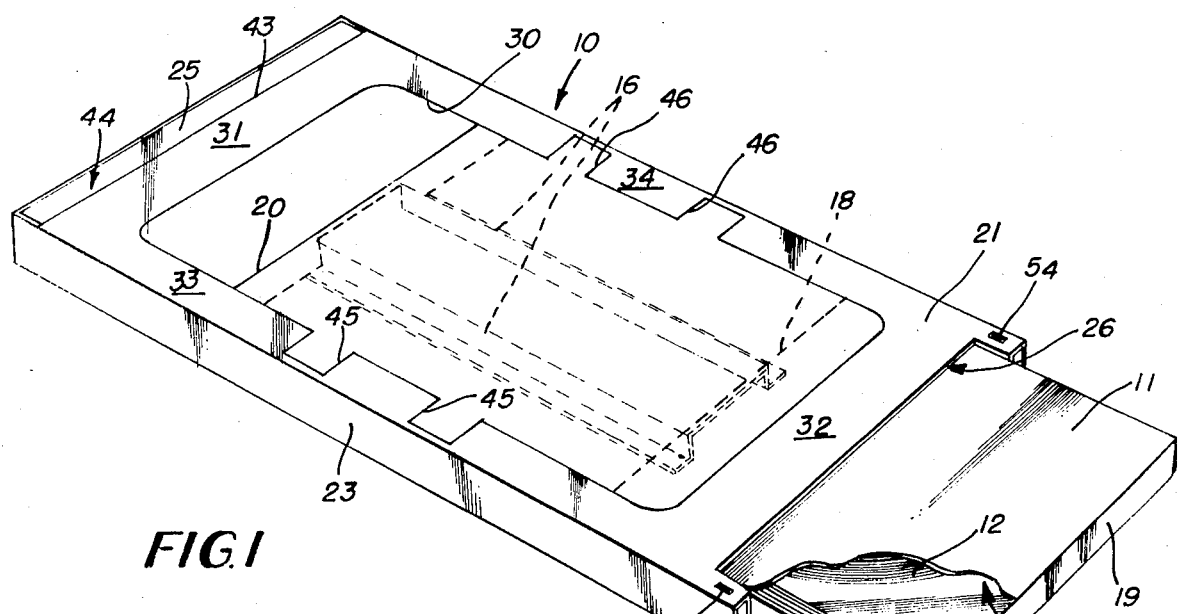
FIG. 1 is a face perspective view of the security receptacle made in accordance with this invention in which the closure is open and a compact disc container is partially inserted within the receptacle.
FIG. 2 is a front face view of the empty receptacle with the closure in a closed position in solid lines and in an open position in phantom.
FIG. 3 is a longitudinal section taken along the line 3—3 of FIG. 2.
FIG. 4 is a view similar to FIG. 3 with the container in operative position received within the receptacle, and with portions of the container broken away to illustrate the position of the storage box.
Figure 5:
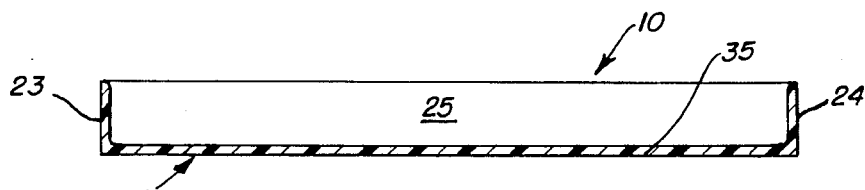
FIG. 5 is an enlarged transverse section taken along the line 5—5 of FIG. 2.
Figure 6:
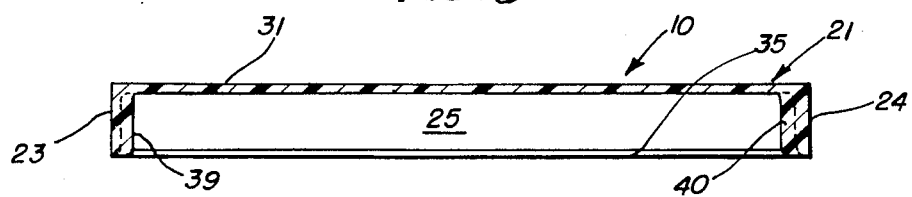
FIG. 6 is an enlarged transverse section taken along the line 6—6 of FIG. 2.
Figure 7:
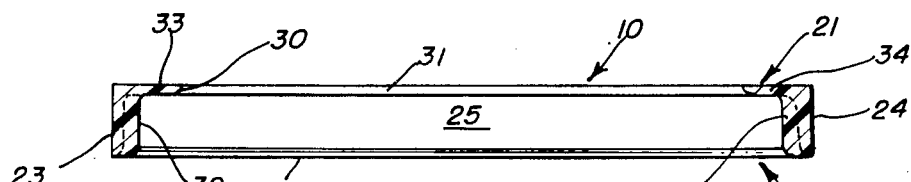
FIG. 7 is an enlarged transverse section taken along the line 7—7 of FIG. 2.
Figure 8:
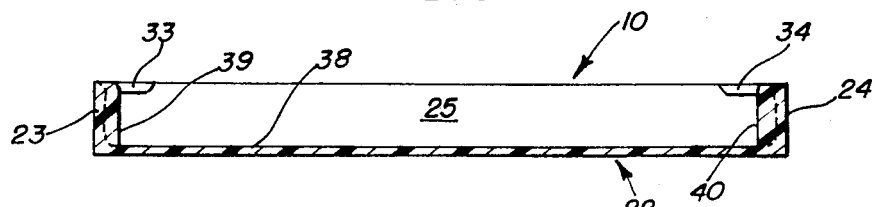
FIG. 8 is an enlarged transverse section taken along the line 8—8 of FIG. 2.
Figure 9:
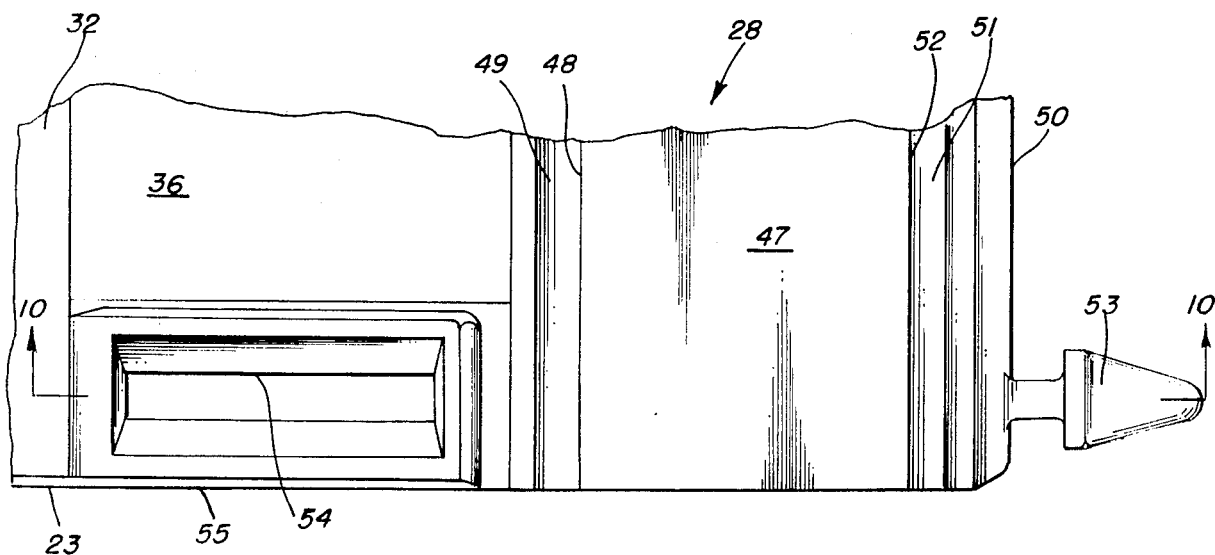
FIG. 9 is a greatly enlarged fragmentary face view of the open end portion of the receptacle, with the hinged lid in an open position.

Referring now to the drawings in more detail, the security receptacle 10 made in accordance with this invention is particularly adapted for receiving in either a right-side-up, or upside down operative position an elongated, rectangular cardboard container 11 containing a compact disc 12. The compact disc 12 is contained within a rectangular or square storage box 13, commonly known as a "jewel box", having a transparent cover 14. The storage box 13 is substantially snugly received within a compartment 15 within one end portion of the container 11. The compartment 15 is defined by the space within the one end portion of the container 11 and a stop member in the form of an elongated cardboard partition or divider 16. The stop member 16 is long enough to normally abut against the interior edge 18 of the jewel box 13, and the opposite external edge of the jewel box 13 is adjacent the corresponding end 19 of the container 11, as illustrated in FIGS. 1 and 4.

In the conventional container 11, the length, or distance between the ends 19 and 20 of the container 11 is more than twice as great as the length of the jewel box 13.

. The receptacle 10 is preferably molded, by injection-molding, from a homogeneous thermoplastic material into a unitary, hollow, parallelepiped body including a front face 21, a back or rear face 22, opposed side walls 23 and 24, a closed end wall 25, and an opposite open end 26.

The hollow space within the receptacle 10 is slightly larger than the contaianer 11, so that container 11 is adapted to substantially snugly fit entirely within the hollow space within the receptacle 10 in an operative position.

The open end 26 is adapted to be closed by a closure member 28.

The front face or front wall 21 of the receptacle 10 includes an enlarged substantially rectangular front display opening 30 which is surrounded or bounded by opposed end flanges 31 and 32 and opposed side flanges 33 and 34, all of which are coplanar and define the front wall 21.

The back face 22 is substantially entirely open, but does include in coplanar relationship a first transverse ledge 35 adjacent the closed end wall 25, a second transverse ledge 36 adjacent the open end 26, and a pair of intermediate transverse rib members 37 and 38.

In a preferred form of the invention, a plurality of Ridge members 39 and 40 are integrally formed with and project inward from the corresponding side walls 23 and 24. These ridge members 39 and 40 extend depthwise between the opposed front and rear faces 21 and 22, respectively, of the receptacle 10 and project inward a uniform distance so that they preferably snugly engage the opposed side walls of the container 11 when the container 11 is inserted and received within the receptacle 10. The ridge members 39 and 40 minimize the lateral movement of the container 11 while received in operative position within the receptacle 10.

The transverse rib member 38 is wider than it is deep and extends longitudinally transversely the entire width of the receptacle 10. The transverse rib member 38 is so located longitudinally relative to the receptacle 10 that its center line 42 (FIG. 2), or at least some portion of the rib member 38, is preferably in transverse alignment with the inner edge 18 of the storage box 13 when the container 11 is fully inserted into the receptacle 10 in operative position, and the end 20 of the container 11 abuts against, or substantially abuts against, the closed end wall 25 of the receptacle 10, as best illustrated in FIG. 12.

In like manner, the transverse rib member 37 is preferably identical to the transverse rib member 38 insofar as size and relative dimensions, and is so located longitudinally of the receptacle 10 that its center line 41, or at least some portion of the rib member 37, is in transverse alignment with the edge 18 of the storage box 13 when the container 11 is inserted upside down and fully received within the receptacle 10, as illustrated in FIG. 13.

In a preferred form of the invention, the edge 43 of the first flange 31 is spaced from the closed end wall 25 a distance slightly greater than the width of the first ledge 35 to provide a display opening 44 through which the graphics on the container 11, such as the title, are clearly visible.

The flange edge 43 is also spaced from the closed end wall 25 a distance slightly greater than the width of the first ledge 35 to facilitate the injection molding of the receptacle 10. In a similar manner, notches 45 and 46 are provided in the respective side flanges 33 and 34 which are in transverse registry with, and slightly wider than, the corresponding rib members 37 and 38, also to facilitate the injection molding of the body of the receptacle 10.

The closure member 28 is also formed integrally with the rest of the body of the receptacle 10 and molded from the same unitary homogeneous thermoplastic material.

In a preferred form of the invention, the closure 28 includes a hinged lid member disclosed in the drawings as a pair of transversely spaced lid flaps 47 integrally joined along their inner edges 48 to the outer edge of the second ledge 36 by a flexible hinge 49 of reduced thickness. A tongue or tab member in the form of a pair of transversely spaced tongue flaps 50 are hinged along their inner edges by the flexible hinge members 51 to the outer edges 52 of the lid flaps 47. Projecting inward from the tongue flap 50 is a tongue member 53. Both hinges 49 and 51 are merely areas of reduced thickness of the same homogeneous thermoplastic material so that all of the parts are formed integrally.

Each of the tongues 53 is adapted to be received in a latch slot 54 formed between two opposed support walls 55 and 56 (FIG. 11). The wall 55 may be an extension of each of the corresponding side walls 23 and 24.

The tongue 53 is wedge-shaped so that when it extends through the slot 54 its enlarged head will prevent it from being retracted back through the locking slot 54 under ordinary manual pressure, so that in effect the locking action between the tongue 53 and the slot 54 will be effectively permanent.

In the operation of the receptacle 10, the closure member 28 is initially in its open position to open the open end 26 to receive the container 11. The container 11 may then be introduced through the open end 26 with either end 19 or 20 being first.

As illustrated in FIG. 1, the container 11 has been partially introduced through the open end 26 of the receptacle 10 with the remote end 20 entering first and the end 19 trailing. The container 11 is moved longitudinally into the receptacle 10 with the corresponding faces of the container 11 sliding along the flanges 32, 33, and 34, as well as sliding over the ledge 36, the intermediate transverse ribs 38 and 37 and ultimately upon the ledge 35 and beneath the end flange 31. The side walls of the container 11 slide between the opposed latch walls 56 and between the opposed ridge members 39 and 40. After the container 11 has been fully inserted into the receptacle 10, the lid flaps 47 are swung about their flexible hinges 49 into their upright positions disclosed in phantom in FIG. 10. The tongue flaps 50 are then swung about their flexible hinges 51 until the tongues 53 are in registry with their corresponding lock slots 54. The tongues 53 are then forced through their lock slots 54 until the enlarged heads of the tongues 53 are wedged beneath the slots 54 and the tongue flaps 50 are flush against the slots 54 and substantially coplanar with the end flange 32.

The spacing between the lid flaps 47 provides another elongated opening through the corresponding end 26 of the receptacle 11 for the display of any graphic materials on the end 19 of the container 11.

The container 11 is then completely secured within the receptacle 10, being restrained against movement in any direction by the respective closed side walls 23 and 24, the closed end wall 25, the opposed flanges 31, 32, 33, and 34, the ledges 35, 36, and the transverse rib members 37 and 38. In the fully assembled position, the inner edge 18 of the storage or jewel box 13 will be in transverse alignment with the transverse rib member 38.

As previously discussed, if the container 11 were inserted with the opposite end 19 first, and after the container 11 is fully inserted and closed by the closure member 28, the inner edge 18 of the storage or jewel box 13 would then be in transverse alignment with the transverse rib member 37, as fully illustrated in FIG. 13.

The rib members 37 or 38, whichever is in transverse alignment with the inner edge 18 of the jewel box 13, would prevent an unauthorized person from introducing his hand or a tool through the face or back openings and tearing through the cardboard container 11 in an attempt to remove the storage box 13.

The thermoplastic material from which the receptacle 10 is made is not only rigid but also tough and resistant to any preliminary flexing or tearing by an unauthorized person. However, after the receptacle 10 including its container 11 is purchased, then the receptacle 10 is susceptible to being cut or otherwise destroyed or mutilated by tools such as shears, to remove the container 11 from the receptacle 10 by an authorized purchaser.

What is claimed is:

1. A security package for an elongated, rectangular compact disc container having opposite end portions and a compartment in one end portion receiving a rectangular storage box containing a compact disc, the storage box having a length less than one-half the length of the rectangular container and having an interior transverse edge, comprising:
    (a) a hollow parallelepiped receptacle having a front face, a back face, opposed side walls, a closed end wall, and an opposite open end,
    (b) said receptacle being slightly larger than, and being adapted to receive lengthwise in a substantially close fit in an operative position, an elongated compact disc container having a compartment in one end portion receiving a rectangular storage box less than one-half the length of the container and having an interior transverse edge,
    (c) closure means for opening and closing said open end,
    (d) said front face comprising a front wall having a substantially large display opening therein,
    (e) said back face being substantially open and comprising a first transverse ledge adjacent said closed end wall, a second transverse ledge adjacent said open end, and first and second transverse planar rib members, said ledges and said rib members being coplanar and spaced from said front wall,
    (f) said first rib member being spaced longitudinally from said open end a distance slightly less than the length of the storage box of the elongated compact disc container received in said receptacle, so that said first rib member is in transverse alignment with the interior edge of the storage box when said container is in a first right-side-up operative position in which the storage box is closer to said open end than said closed end wall of said receptacle,
    (g) said second rib member being longitudinally spaced from said closed end wall a distance slightly less than the length of the storage box of the elongated compact disc container received in said receptacle so that said second rib member is in transverse alignment with the interior edge of the storage box when said container is in a second upside down operative position in which the storage box is closer to said closed end wall than said open end of said receptacle.

2. The invention according to claim 1 in which said front wall comprises opposed end flanges and opposed side flanges surrounding said large display opening, the distance between said opposed end flanges being less than the length of the elongated compact disc container received in said receptacle and the distance between said opposed side flanges being less than the width of the compact disc container received in said receptacle in an operative position.

3. The invention according to claim 2 further comprising notches in said side flanges in transverse alignment with said first and second transverse rib members.

4. The invention according to claim 2 further comprising an elongated transverse display opening extending through said front wall adjacent said closed end wall and in transverse alignment with said first transverse ledge.

5. The invention according to claim 1 in which said closure means comprises a lid member having opposed side edges, first hinge means connection one of said side edges to said second transverse ledge, permitting said lid member to swing between an open position away from said open end of said receptacle and a closed position at least partially closing said open end, a tongue member, second hinge means connection said tongue member to said other side edge permitting said tongue member to swing over said front face in a closed position, said tongue member having a projecting locking tongue, slot means on said receptacle for receiving said locking tongue in said closed position.

6. The invention according to claim 5 in which said lid member comprises a pair of transversely spaced lid flaps, each tongue member comprises a pair of transversely spaced tongue flaps, said second hinge means flexibly connecting said corresponding tongue flaps and lid flaps, said tongue member comprising a locking tongue projecting from each corresponding tongue flap, said slot means comprising a pair of transversely spaced slot members for receiving said corresponding locking tongues and fixed to said opposite side walls and spaced apart sufficiently to permit the entry of a compact security container through said opening when said lid flaps are in said open position.

7. The invention according to claim 5 in which said receptacle is made of homogeneous thermoplastic material and molded as a unitary body.

* * * * *